UL007459072B2

(12) United States Patent
Bitterlich et al.

(10) Patent No.: US 7,459,072 B2
(45) Date of Patent: Dec. 2, 2008

(54) METHOD FOR PROCESSING NAPHTHA

(75) Inventors: Stefan Bitterlich, Dirmstein (DE);
Hartwig Voss, Frankenthal (DE);
Gunter Schuch, Ludwigshafen (DE);
Rudolf Sinnen, Weisenheim (DE);
Heinrich Laib, Limburgerhof (DE);
Peter Paessler, Neustadt (DE)

(73) Assignee: BASF Aktiengesellschaft, Ludwigshafen (DE)

(*) Notice: Subject to any disclaimer, the term of this patent is extended or adjusted under 35 U.S.C. 154(b) by 496 days.

(21) Appl. No.: 10/544,427

(22) PCT Filed: Jan. 24, 2004

(86) PCT No.: PCT/EP2004/000602

§ 371 (c)(1),
(2), (4) Date: Aug. 4, 2005

(87) PCT Pub. No.: WO2004/069962

PCT Pub. Date: Aug. 19, 2004

(65) Prior Publication Data

US 2006/0081500 A1 Apr. 20, 2006

(30) Foreign Application Priority Data

Feb. 7, 2003 (DE) .............................. 103 05 060

(51) Int. Cl.
*C10G 9/00* (2006.01)
*C10G 7/00* (2006.01)
*C10G 7/08* (2006.01)
*C10G 31/11* (2006.01)
*C07C 4/02* (2006.01)

(52) U.S. Cl. .............................. 208/92; 208/49; 208/67; 208/72; 208/78; 208/80; 208/82; 208/83; 208/94; 208/85; 208/106; 208/125; 208/130; 208/132; 585/648; 585/652

(58) Field of Classification Search ................. 208/106, 208/125, 130, 132, 92, 49, 67, 72, 78, 80, 208/82, 83, 94; 585/648, 652
See application file for complete search history.

(56) References Cited

U.S. PATENT DOCUMENTS

| 3,714,022 A * | 1/1973 | Stine ........................... 208/62 |
| 3,758,410 A * | 9/1973 | Shih ............................ 510/506 |
| 3,899,412 A * | 8/1975 | Rowe et al. ................... 208/92 |
| 3,957,621 A * | 5/1976 | Bonacci et al. ............... 208/60 |
| 3,966,833 A * | 6/1976 | Cosyns et al. ................ 585/489 |
| 4,522,688 A * | 6/1985 | Yokogawa et al. ............ 203/28 |
| 5,017,279 A * | 5/1991 | Oswald et al. ................ 208/67 |
| 5,635,055 A * | 6/1997 | Sweet et al. ................. 208/99 |
| 5,914,435 A * | 6/1999 | Streicher et al. ............. 585/819 |
| 6,013,852 A * | 1/2000 | Chandrasekharan et al. 585/648 |
| 2002/0082462 A1* | 6/2002 | Ferraro et al. ............... 585/818 |
| 2003/0092952 A1* | 5/2003 | Netzer ......................... 585/648 |
| 2006/0276679 A1* | 12/2006 | Little et al. .................. 585/324 |

OTHER PUBLICATIONS

G.W. Meindersma: "Economical feasibility of zeolite membranes for industrial scale separations of aromatic hydrocarbons", Desalination, vol. 149, pp. 29-34, 2002.

* cited by examiner

*Primary Examiner*—Glenn Caldarola
*Assistant Examiner*—Huy-Tram Nguyen
(74) *Attorney, Agent, or Firm*—Oblon, Spivak, McClelland, Maier & Neustadt, P.C.

(57) ABSTRACT

Process for the work-up of naphtha, wherein
a) naphtha or a stream produced from naphtha in a pretreatment step is separated in a membrane unit into a stream A which is depleted in aromatics and a stream B which is enriched in aromatics, with the aromatics concentration in stream A being from 2 to 12% by weight (step a),
b) at least part of the substream A is fed to a steam cracker (step b),
c) at least part of the substream B is fed to a unit in which it is separated by means of a thermal process into a stream C which has a lower aromatics content than stream B or a plurality of streams C', C'', C''' ... which each have lower aromatics contents than stream B and a stream D which has a higher aromatics content than stream B or a plurality of streams D', D'', D''' ... which each have higher aromatics contents than stream B (step c), and
d) the stream C or at least one of the streams C', C'', C''', in each case in part or in its entirety, is added to the feed to the steam cracker or fed into the steam cracker itself (step d).

13 Claims, No Drawings

METHOD FOR PROCESSING NAPHTHA

The present invention relates to a process for the work-up of naphtha, wherein a) naphtha or a stream produced from naphtha in a pretreatment step is separated in a membrane unit into a stream A which is depleted in aromatics and a stream B which is enriched in aromatics, with the aromatics concentration in stream A being from 2 to 12% by weight (step a), b) at least part of the substream A is fed to a steam cracker (step b), c) at least part of the substream B is fed to a unit in which it is separated by means of a thermal process into a stream C which has a lower aromatics content than stream B or a plurality of streams C', C'', C''' . . . which each have lower aromatics contents than stream B and a stream D which has a higher aromatics content than stream B or a plurality of streams D', D'', D''' . . . which each have higher aromatics contents than stream B (step c), and d) the stream C or at least one of the streams C', C'', C''', in each case in part or in its entirety, is added to the feed to the steam cracker or fed into the steam cracker itself (step d).

Petroleum fractions referred to collectively as naphtha generally contain considerable concentrations of aromatics, in particular benzene, toluene and xylenes, in a total concentration of usually from 5 to 50% by weight. If the naphtha is processed in a steam cracker with the aim of producing ethylene, propylene and further high-value hydrocarbons, the abovementioned and possibly other aromatics remain essentially unreacted there. In this use of the naphtha, the aromatics therefore represent an undesirable ballast which, for a given amount of desired products, leads in the steam cracker to an increase in the size of many components of the steam cracker and also to an increase in the operating costs, especially those incurred as a result of heating and recooling the feed or product stream.

In Desalination 149 (2002), 29-34 (Meindersma, de Haan), it is proposed that naphtha be fed to a membrane unit in which aromatics are selectively removed from the naphtha before it is fed into the cracker. The membrane unit described there is equipped with aromatics-selective (see below for definition) zeolite membranes and is designed so that a feed stream having an aromatics content of 10% is separated into substreams having aromatics contents of 2 and 98%, respectively.

These comparatively high purities of the substreams and the fact that they are produced exclusively by means of membranes lead, in the variant described, to very high costs, especially because of the large membrane area required.

It is an object of the present invention to provide a more efficient process for the work-up of naphtha in a steam cracker, in which the feed to the steam cracker is not heavily laden with largely inert aromatics.

Naphtha is generally a mixture comprising paraffinic, aliphatic alicyclic, aromatic and olefinic $C_4$-$C_{12}$-hydrocarbons boiling in the range from 30° C. to 230° C., especially from 30° C. to 180° C. and in particular from 30° C. to 160° C. Such mixtures are usually obtained by distillation from crude oil, crude oil fractions, from the feed to catalytic reforming plants, from the reformate or the reformate fractions from the catalytic reforming plant, and fractions from thermal and catalytic cracking plants, with a number of these measures also being able to be combined. Naphtha can also be produced by mixing (blending) various crude oil fractions, reformate, reformate fractions or fractions from thermal or catalytic cracking plants.

The aromatics to be separated off are usually aromatic $C_6$-$C_{12}$-hydrocarbons and mixtures thereof. The aromatics are usually essentially benzene, toluene or xylenes or mixtures thereof.

The concentration of aromatics in the naphtha used or in the stream produced from naphtha in a pretreatment step is from 8 to 50% by weight, preferably from 8 to 20% by weight, particularly preferably from 10 to 15% by weight.

The feed stream can have been pretreated in a hydrogenation plant in order to reduce the sulfur (S) and/or nitrogen (N) compounds and/or to saturate the olefins.

The pretreatment step mentioned under a) preferably comprises a distillation or rectification which, for example, separates the naphtha into two streams having different aromatics contents, of which the stream which is richer in aromatics is fed to the membrane unit and the stream which has a lower aromatics content is fed directly to the cracker or added to the feed stream to the cracker. This offers the advantage that, at a given amount of aromatics in the naphtha fed to the overall process, the concentration of aromatics in the membrane unit is increased, which leads to an increase in the transmembrane flux.

The membrane unit is configured and operated so that the aromatics concentration in the stream A is from 2 to 12% by weight, preferably from 4 to 10% by weight. The aromatics concentration in stream B is generally from 10 to 90% by weight, preferably from 20 to 60% by weight.

The membrane unit referred to under a) preferably comprises at least one aromatics-selective membrane. In this context, the term "aromatics-selective" means that the total concentration of aromatics in the permeate of a membrane apparatus equipped with the membrane is higher than that in the retentate. Such membranes are known per se to those skilled in the art; descriptions may be found, for example, in U.S. Pat. No. 2,930,754 (Stuckey), U.S. Pat. No. 5,128,439 (Sartori et al.) and EP 583,957 (Sartori et al.).

A measure of the aromatics selectivity is the separation factor α applicable to a particular mixture of an aromatic and a nonaromatic, which is defined as follows:

$$\alpha(\text{aromatic/nonaromatic}) = (C_{A,P}/C_{NA,P})/(C_{A,F}/C_{NA,F})$$

where $C_{A,P}$=concentration of the aromatic on the permeate side, $C_{NA,P}$=concentration of the nonaromatic on the permeate side, $C_{A,F}$=concentration of the aromatic on the feed side, $C_{NA,F}$=concentration of the nonaromatic on the feed side, where the feed side is the side of the membrane where the mixture to be separated is introduced. The stated concentrations are, according to the applicable definition, local, i.e. only at a defined point on the membrane in a membrane apparatus; the separation factor α can be determined experimentally by, for example, the ratio of feed mixture flowing through a measurement cell equipped with a piece of membrane to the area of the piece of membrane being selected so that the composition of the feed mixture remains virtually constant while it flows over the membrane.

The membrane used in the process of the present invention has an α value (toluene/n-octane) of from 1.5 to 100, preferably from 4 to 40, particularly preferably from 5 to 20.

The membranes used can, as one alternative, comprise polymers, particularly preferably polymers containing polar groups; examples of suitable polymers are polyacrylates, polyacrylic acid, polycarbonates, polyterephthalates, polyurethanes, polyamides, polyimides, polyetherimides, polyether ketones, cellulose derivatives, partially halogenated polyolefins, e.g. PVC, or various sulfonated polymers and also copolymers. When polymer membranes are used, it has been found to be advantageous for them to be crosslinked by means of suitable reagents, because this can counter selectivity-reducing swelling of the polymer.

The membranes can also consist of inorganic material such as microporous carbon (produced by pyrolysis of organic polymers such as PP) or zeolites. Zeolites of the faujasite type, e.g. NaX or NaY, are particularly useful here.

The membranes are preferably configured as integral-asymmetrical membranes or as composite membranes in which the actual separation layer effecting the molecular separation has a thickness of from 0.05 to 100 µm, preferably from 0.1 to 30 µm, and has been applied to one or more mesoporous and/or macroporous support(s).

The membranes can be used in the form of flat, cushion or capillary elements or mono-channel tubular elements or multichannel tubular elements, as are known per se to those skilled in the art. In the case of membrane elements having a tubular geometry, the separation layer is preferably located on the inside of the tube.

The membranes are generally surrounded by one or more housings comprising a polymeric, metallic or inorganic material, with the connection between housing and membrane being formed by a sealing polymer (e.g. elastomer) or inorganic material.

The membrane unit is preferably operated in the manner of a pervaporation as is known per se to those skilled in the art, in which the mixture to be separated (feed) in liquid form is brought into contact with the membrane and the stream passing through the membrane (permeate) is taken off in gaseous form. The temperature at which the mixture to be separated is brought into contact with the membrane is from 20 to 400° C., preferably from 80 to 250° C. The pressure on the feed side of the membrane is from 1 to 100 bar abs., preferably from 1 to 20 bar abs. The pressure on the permeate side is from 1 to 2000 bar abs., preferably from 10 to 1100 mbar abs., with the pressure on the feed side always being higher than that on the permeate side. The permeate-side pressure is set by removing the permeate stream by means of a vacuum pump and/or a compressor and/or by condensing the permeate stream at a temperature which leads to an intrinsic pressure of the permeate mixture corresponding to the desired permeate pressure. In the case of pervaporation, it can be advantageous to divide the membrane area required over a plurality of apparatuses and, for the purposes of compensating for the heat loss caused by the liquid-gas phase transition, to install one or more heat exchangers between the membrane apparatuses.

However, the membrane unit can also be operated in the manner of a vapor permeation as is also known per se to those skilled in the art. This is distinguished from pervaporation by the feed being brought into contact with the membrane in vapor form.

The membrane process can be carried out as a single-stage process, i.e. the permeate from a membrane apparatus or the combined permeate from a plurality of membrane apparatuses through which the feed flows in succession or in parallel forms/form, without further treatment, the stream B which is enriched in aromatics and the part which has not permeated through the membrane (retentate) forms, without further treatment, the abovementioned stream A which is depleted in aromatics. As an alternative, the membrane process can be a two-stage or multistage process in which the permeate from one stage is passed as feed to the following stage and the retentate from this stage is mixed into the feed to the first-named stage. Such arrangements are known per se (cf., for example, Sep. Sci. Technol. 31 (1996), 729 ff).

The unit specified under c) preferably comprises one or more distillation steps using one or more auxiliaries. In this context, an auxiliary is a component whose addition to a mixture of an aromatic hydrocarbon and an aliphatic or cycloaliphatic hydrocarbon alters the relative volatility of the two hydrocarbons, preferably in such a way that the relative volatility of the aliphatic or cycloaliphatic hydrocarbon increases compared to the aromatic hydrocarbon. Suitable auxiliaries are preferably organic compounds which contain polar functional groups such as hydroxyl, amino, ketone, ester, sulfonyl, sulfoxide or, particularly preferably, amide. Most preferred auxiliaries are N-methylpyrrolidone and N-formylmorpholine. The distillation step or steps using one or more auxiliaries is/are preferably carried out in the manner of an extractive rectification as is known per se (cf. K. Sattler, Thermische Trennverfahren, VCH, $2^{nd}$ edition 1995, p. 146 ff.).

The unit specified under c) can also comprise an extraction step using an extractant to which the description of the auxiliary given in the preceding paragraph likewise applies. It can also be present as a mixture with water. If the unit specified under c) comprises an extraction step, the latter is advantageously combined with a distillation apparatus in which separation of extractant and aromatics is carried out.

Such processes are known per se to those skilled in the art, cf., for example, Hillis and Folkins in: Ullmann's Encyclopedia, Sixth Edition, Electronic Release, Chapter 6.

In a preferred embodiment of the process, the aromatics-enriched stream B from the membrane unit is subjected to a rectification which is preferably operated in such a way that the top product has a higher concentration of hydrocarbons having 5 or fewer carbon atoms per molecule than the stream B and the bottom product has a higher concentration of hydrocarbons having 6 or more carbon atoms per molecule than the stream B.

All or part of the bottom product is passed to step c).

All or part of the top product can advantageously be added to the feed to the steam cracker or be fed to the steam cracker itself.

In general, the aromatics concentration of the stream C which is recirculated to the steam cracker as set forth in step d) or of the stream or streams C', C", C''' . . . which is/are recirculated to the steam cracker as set forth in step d) is from 0.01 to 5% by weight.

We claim:

1. A process for the work-up of naphtha, comprising
   a) separating, in a membrane unit, the naphtha or a stream produced from the naphtha into a stream A which is depleted in aromatics and a stream B which is enriched in aromatics, wherein the aromatics concentration in stream A is from 2 to 12% by weight,
   b) feeding at least part of the stream A to a steam cracker,
   c) feeding at least part of the stream B to a unit wherein stream B is separated by means of a thermal process into at least one stream C comprising a lower aromatics content than stream B and at least one stream D comprising a higher aromatics content than stream B, and
   adding the at least one stream C to the steam cracker directly, as part of a feed stream, or a combination thereof.

2. The process of claim 1, wherein the naphtha is subjected, prior to introduction into the membrane unit, to a pretreatment step comprising separating the naphtha into two streams comprising different aromatics contents, wherein the stream comprising a higher aromatics content is fed to the membrane unit and wherein the stream comprising a lower aromatics content is fed to the steam cracker directly, as part of a feed stream, or a combination thereof.

3. The process of claim 1, further comprising rectifying the stream B that the top product of the rectifying of the stream B comprises a higher concentration of hydrocarbons comprising 5 or fewer carbon atoms per molecule than the stream B and the bottom product of the rectifying of the stream B comprises a higher concentration of hydrocarbons comprising 6 or more carbon atoms per molecule than the stream B, and wherein at least part of the bottom product is passed to step c).

4. The process of claim 3, wherein at least part of the top product from the rectifying of the stream B is added to the steam cracker directly, as part of a feed stream, or a combination thereof.

5. The process of claim 1, wherein the separation by means of a thermal process comprises at least one distillation.

6. The process of claim 1, wherein the aromatics are essentially benzene, toluene, xylenes, or a mixture thereof.

7. The process of claim 1, wherein the aromatics concentration in stream B is from 10 to 90% by weight.

8. The process of claim 1, wherein the stream C comprises an aromatics concentration of from 0.01 to 5% by weight.

9. The process of claim 4, wherein the at least part of the top product from the rectifying of stream B is added to a feed and the feed comprising the at least part of the top product from the rectifying of stream B is fed to the steam cracker.

10. The process of claim 5, wherein the at least one distillation reduces the relative volatility of an aromatic hydrocarbon in a mixture of an aromatic hydrocarbon and an aliphatic or cycloaliphatic hydrocarbon.

11. The method of claim 1, wherein the at least one stream C comprises the streams C', C'', and C''', each of which is added to the steam cracker directly, as part of a feed stream, or a combination thereof.

12. The method of claim 2, wherein the separating comprises distillation.

13. The process of claim 1, wherein the aromatics are benzene, toluene, xylenes, or a mixture thereof.

* * * * *